(12) United States Patent
Kukimoto et al.

(10) Patent No.: US 10,191,548 B2
(45) Date of Patent: Jan. 29, 2019

(54) OPERATION APPARATUS

(71) Applicant: FUJITSU TEN LIMITED, Kobe-shi, Hyogo (JP)

(72) Inventors: Osamu Kukimoto, Kobe (JP); Teru Sawada, Kobe (JP); Tadayuki Yamashita, Kobe (JP); Masahiro Iino, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 0 days.

(21) Appl. No.: 14/956,073

(22) Filed: Dec. 1, 2015

(65) Prior Publication Data

US 2016/0162026 A1 Jun. 9, 2016

(30) Foreign Application Priority Data

Dec. 8, 2014 (JP) ................................. 2014-247820

(51) Int. Cl.
*G06F 3/01* (2006.01)
*B60K 35/00* (2006.01)
(Continued)

(52) U.S. Cl.
CPC .............. *G06F 3/016* (2013.01); *B60K 35/00* (2013.01); *G06F 3/04847* (2013.01);
(Continued)

(58) Field of Classification Search
CPC ............ B60K 35/00; B60K 2350/1024; B60K 2350/965; G06F 3/016; G06F 3/04847; G06F 3/04883
(Continued)

(56) References Cited

U.S. PATENT DOCUMENTS

2002/0149561 A1* 10/2002 Fukumoto .......... G01C 21/3664
345/156
2008/0216578 A1* 9/2008 Takashima .............. B06B 1/045
73/658
(Continued)

FOREIGN PATENT DOCUMENTS

JP 2010-009321 A 1/2010
JP 2010-224684 A 10/2010
(Continued)

OTHER PUBLICATIONS

Jul. 3, 2018 Office Action issued in Japanese Patent Application No. 2014-247820.
(Continued)

*Primary Examiner* — Stacy Khoo
(74) *Attorney, Agent, or Firm* — Oliff PLC

(57) ABSTRACT

A touch sensor that generates an output based on an operation performed to the touch sensor by an operator; a transducer attached to the touch sensor and configured to vibrate the touch sensor so as to give a touch feeling to the operator contacting the touch sensor; and a controller configured to (i) determine a content of the operation performed to the touch sensor by the operator based on the output of the touch sensor and (ii) select one of the plurality of operation modes based on the determined content of the operation performed to the touch sensor by the operator. The controller causes the transducer to vibrate the touch sensor with different patterns of vibration so as to give different touch feelings to the operator contacting the touch sensor depending on the determined content of the operation performed to the touch sensor by the operator.

20 Claims, 13 Drawing Sheets

(51) Int. Cl.
*G06F 3/0488* (2013.01)
*G06F 3/0484* (2013.01)

(52) U.S. Cl.
CPC .. *G06F 3/04883* (2013.01); *B60K 2350/1024* (2013.01); *B60K 2350/965* (2013.01)

(58) Field of Classification Search
USPC ............... 345/156–179; 178/18.01–18.09
See application file for complete search history.

(56) References Cited

U.S. PATENT DOCUMENTS

| | | | | |
|---|---|---|---|---|
| 2009/0227296 | A1* | 9/2009 | Kim | G06F 3/016 455/566 |
| 2011/0260991 | A1* | 10/2011 | Aono | G06F 3/016 345/173 |
| 2014/0111456 | A1* | 4/2014 | Kashiwa | G06F 3/0414 345/173 |
| 2014/0168110 | A1* | 6/2014 | Araki | G06F 3/016 345/173 |
| 2014/0319232 | A1* | 10/2014 | Gourlay | F24F 11/0086 236/51 |

FOREIGN PATENT DOCUMENTS

| | | |
|---|---|---|
| JP | 2013-182433 A | 9/2013 |
| JP | 2014-102829 A | 6/2014 |
| JP | 2014-182659 A | 9/2014 |
| JP | 2015-049685 A | 3/2015 |
| JP | 2015-130006 A | 7/2015 |

OTHER PUBLICATIONS

Oct. 23, 2018 Office Action issued in Japanese Patent Application No. 2014-247820.

* cited by examiner

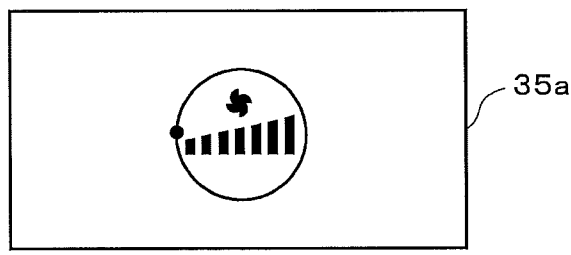
FIG.10A
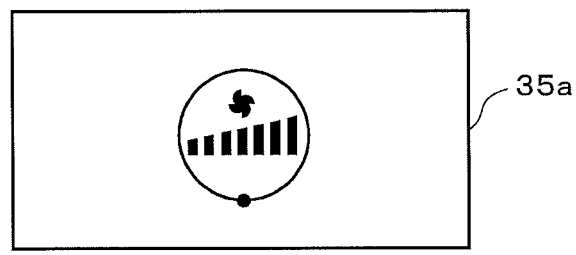
FIG.10B
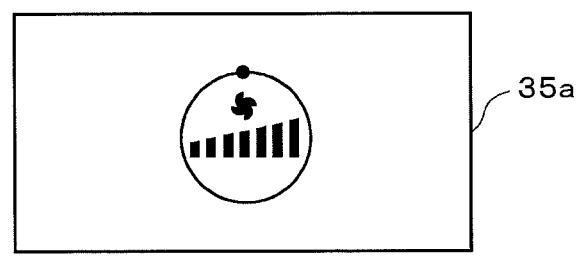
FIG.10C

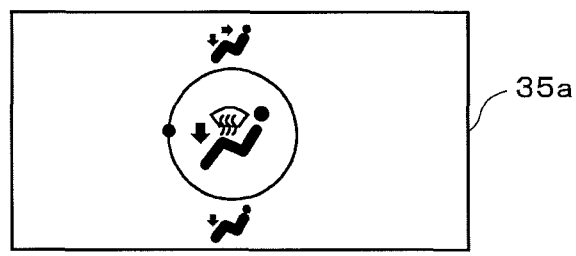
FIG.11A
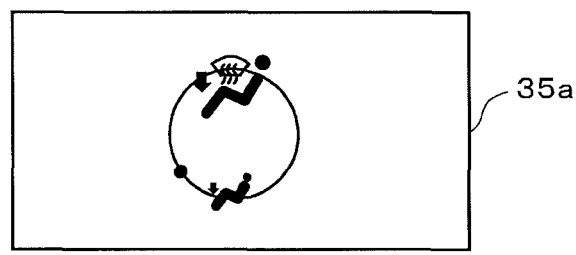
FIG.11B
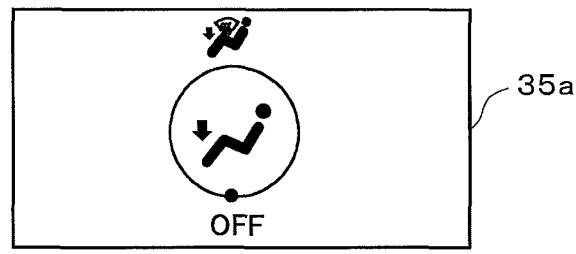
FIG.11C

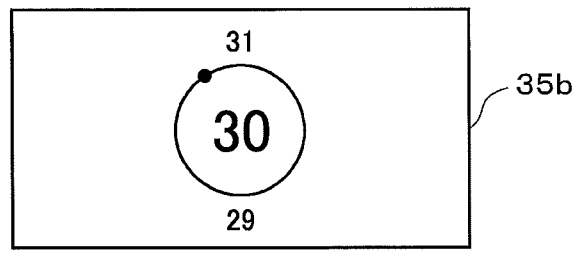
FIG.14A
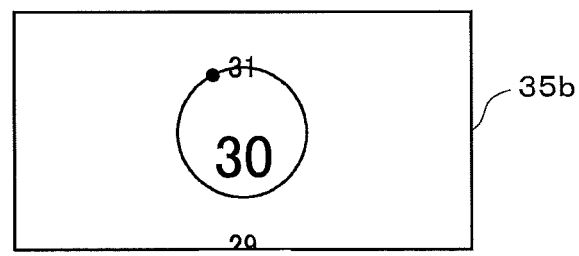
FIG.14B
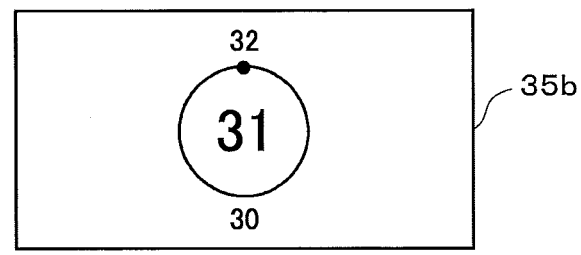
FIG.14C

OPERATION APPARATUS

BACKGROUND OF THE INVENTION

Field of the Invention

The invention relates to a technology for operating a touch panel.

Description of the Background Art

A conventional touch panel itself was not physically changed by an operation of a user. Thus, the touch panel did not give any feedback in response to the operation so that the user could not gain any touch feeling. Therefore, a technology is known that when an operation is performed by the user, a feedback in response to the operation is given to a user by vibrating the touch panel.

However, the conventional technology only causes the touch panel to vibrate when the user performs an operation with the touch panel. Thus, the user can receive a feedback in response to the operation but does not know a type of the operation received by the touch panel. Various types of operation are used as touch panel operation. Therefore, in order to improve operability of the touch panel for the user, it is preferable that feedback about the type of the operation should be given to the user.

SUMMARY OF THE INVENTION

According to one aspect of the invention, an operation apparatus that is operable in a plurality of operation modes includes: a touch sensor that generates an output based on an operation performed to the touch sensor by an operator; a transducer attached to the touch sensor and configured to vibrate the touch sensor so as to give a touch feeling to the operator contacting the touch sensor; and a controller configured to (i) determine a content of the operation performed to the touch sensor by the operator based on the output of the touch sensor and (ii) select one of the plurality of operation modes based on the determined content of the operation performed to the touch sensor by the operator. The controller causes the transducer to vibrate the touch sensor with different patterns of vibration so as to give different touch feelings to the operator contacting the touch sensor depending on the determined content of the operation performed to the touch sensor by the operator.

Thus, since the operation mode corresponding to the determined content of the operation can be selected and the touch feeling corresponding to the determined content of the operation can be given, the operator contacting the touch sensor can be given a feedback not only about the fact that the operator performed the operation but also about a type of the operation performed by the operator.

According to another aspect of the invention, the content of the operation is a track of changes of touch points on the touch sensor touched by the operator.

Thus, the touch feeling given to the user can be changed for each content of the operation.

Therefore, an object of the invention is to provide a technology for giving a feedback about a type of an operation performed by a user when the user operated a touch sensor.

These and other objects, features, aspects and advantages of the invention will become more apparent from the following detailed description of the invention when taken in conjunction with the accompanying drawings.

BRIEF DESCRIPTION OF THE DRAWINGS

FIGS. 10A-10C illustrate an air volume adjustment operation;
FIGS. 11A-11C illustrate an airflow direction operation;
FIGS. 14A-14C illustrate a volume adjustment operation.

DESCRIPTION OF THE EMBODIMENTS

With reference to the drawings, an embodiment of the invention is hereinafter, described.

<1. Embodiment>
<1-1. System Outline>

Figure 1:
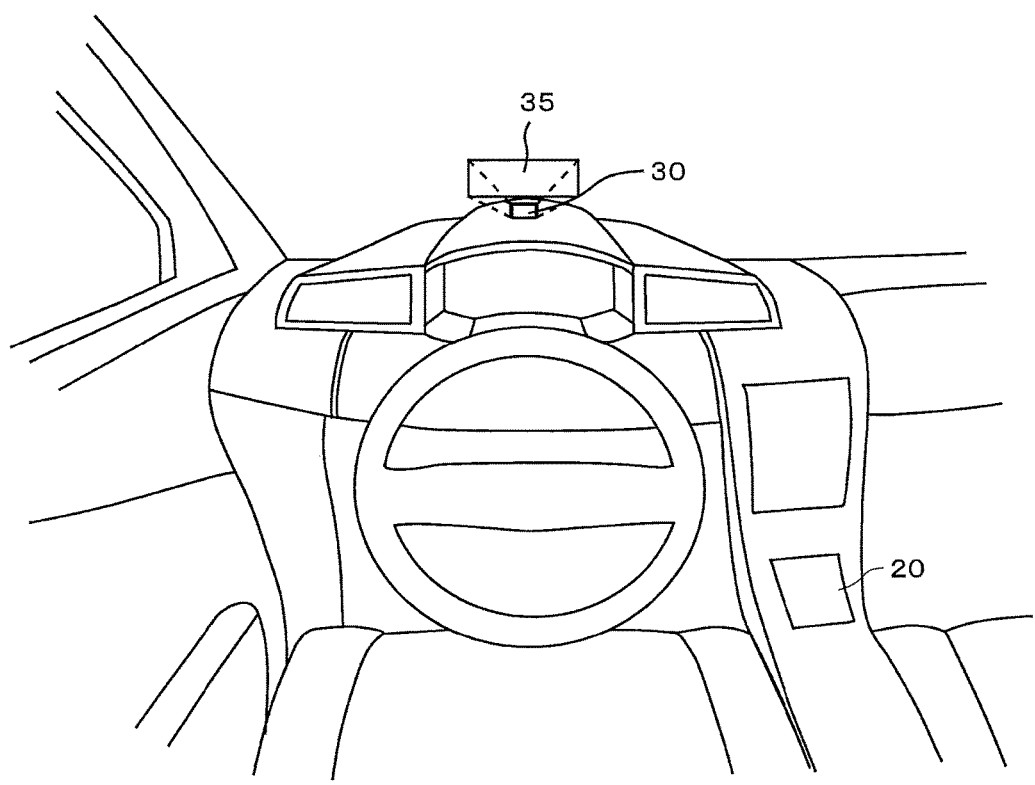
FIG. 1 illustrates an outline of an operation system.
Figure 2:
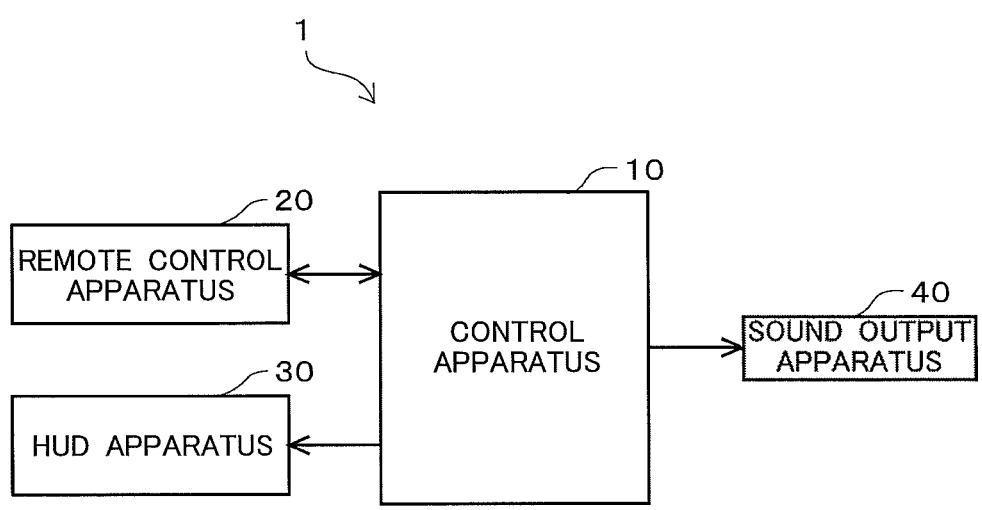
FIG. 2 illustrates an outline of the operation system.

FIG. 1 and FIG. 2 illustrate an operation system 1. In this embodiment, the operation system 1 that is mounted on a vehicle, such as a car, is explained as an example. FIG. 1 illustrates a cabin of a vehicle on which the operation system 1 is mounted. FIG. 2 illustrates a schematic configuration of the operation system 1.

As shown in FIG. 1 and FIG. 2, the operation system 1 includes a control apparatus 10, a remote control apparatus 20, a head-up display apparatus (hereinafter referred to as "HUD apparatus") 30 and an sound output apparatus 40. The control apparatus 10 is electrically connected to the remote control apparatus 20, the HUD apparatus 30 and the sound output apparatus 40 and sends and receives signals to/from each of those apparatus.

The control apparatus 10 controls other apparatuses (e.g. the remote control apparatus 20, the sound output apparatus 40, etc.) on the vehicle. In this embodiment, when a user (mainly driver) performs a predetermined operation (gesture) with the remote control apparatus 20, the remote control apparatus 20 gives the user a feedback corresponding to a content of the operation and/or outputs, from the sound output apparatus 40, sound corresponding to the content of the operation. The control apparatus 10 performs such control.

The remote control apparatus 20 is an operation apparatus including a touch sensor, and is provided on a center console in the vehicle within reach of the user. An image showing the content of the operation performed with the remote control apparatus 20 is displayed on the HUD apparatus 30. The user of the operation system 1 operates the remote control apparatus 20 at hand while looking at a screen 35 displayed by the HUD apparatus 30. Thus, the user can perform the operation remotely (so-called touch typing) with the operation system 1, without looking at hand.

Moreover, when the user performs a specific operation to the touch sensor of the remote control apparatus 20, the operation system 1 changes types of vibration of the touch sensor based on types of the specific operations. Thus, the user can gain a touch feeling corresponding to the content of the operation. In other words, the user receives a feedback corresponding to the content of the operation.

The HUD apparatus 30 is an apparatus that projects an image on a front windshield, substantially in front of the user. The user operates the touch sensor of the remote control apparatus 20 while looking at the image projected by the HUD apparatus 30.

The sound output apparatus 40 is a speaker that outputs audio data to an outside. When the user performs the specific operation with the remote control apparatus 20, the sound output apparatus 40 outputs audio data of a sound effect corresponding to the specific operation. In a case where an audio apparatus, a navigation apparatus, etc. are provided separately, audio data for the audio apparatus and/or for the navigation apparatus is output from the sound output apparatus 40.

As described above, the operation system 1 is a system that includes the touch sensor and a display screen of which positions are different from each other, that is remotely operated, and that gives the feedback corresponding to the content of the operation. In other words, the operation system 1 gives the user the feedback about the type of the operation performed by the user. Moreover, the operation system 1 is a system that the user can operate without looking at hand. A concrete configuration of each apparatus is hereinafter described.

<1-2. System Configuration>

Figure 3:
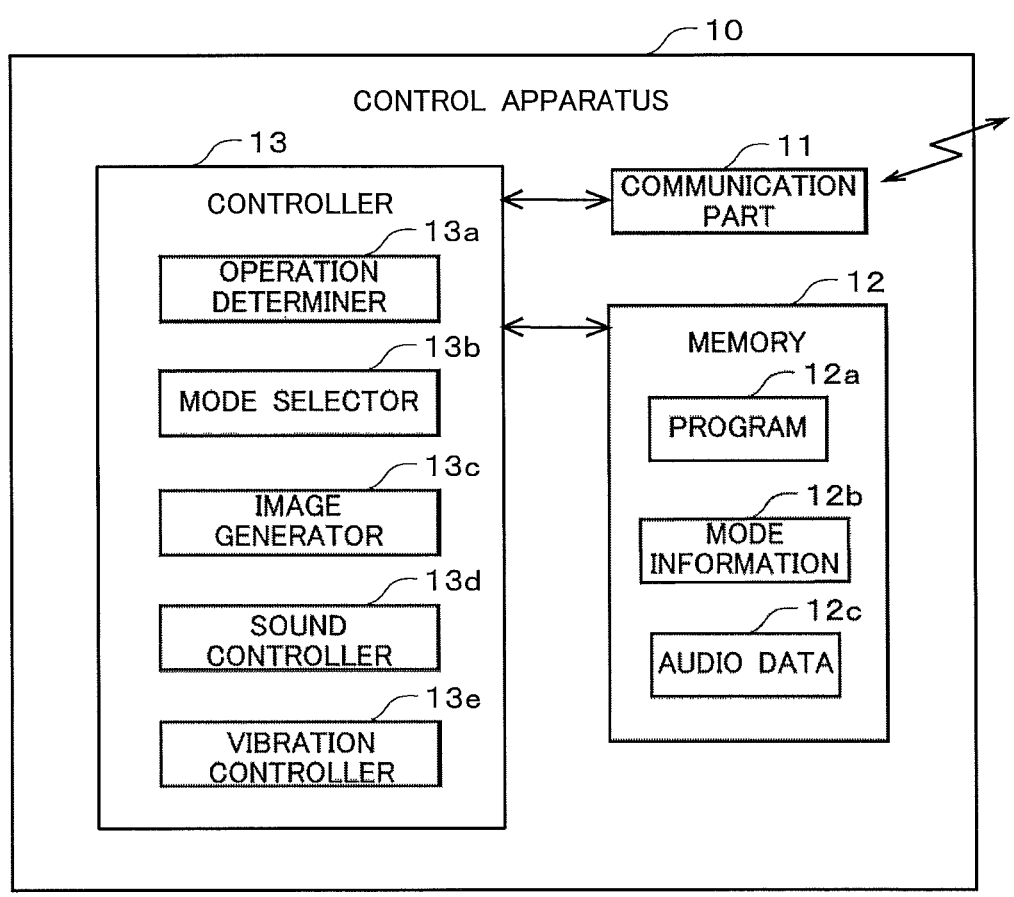
FIG. 3 illustrates an outline of a control apparatus.

The concrete configuration of the operation system 1 is described with reference to FIG. 3 to FIG. 6. First, a configuration of the control apparatus 10 is described. FIG. 3 illustrates a schematic configuration of the control apparatus 10. As shown in FIG. 3, the control apparatus 10 includes a communication part 11, a memory 12 and a controller 13.

The communication part 11 is communicably connected to the remote control apparatus 20 via wireless communications, such as Wi-Fi (registered trademark), and sends and receives various types of data to/from the remote control apparatus 20. Moreover, the communication part 11 is communicably connected to the HUD apparatus 30 and the sound output apparatus 40 via in-vehicle local area network (LAN), such as controller area network (CAN), and sends and receives various types of data to/from the HUD apparatus 30 and the sound output apparatus 40. The foregoing connections are merely examples and the communication part 11 may be connected by a cable or via the wireless communications.

The memory 12 is a non-volatile semiconductor memory from/to which data is electrically read and written and on which data is not erased even while the power is off. The memory 12 is, for example, an electrically erasable programmable read-only memory (EEPROM) or a flash memory. However, another type of memory medium can be used. The memory 12 may be a hard disk drive including a magnetic disk. The memory 12 stores a program 12a, mode information 12b, audio data 12c, etc. The program 12a is so-called system software that is read out by the controller 13 and is executed for control of the control apparatus 10 by the controller 13.

The mode information 12b is information including a content of each operation (gesture) of the user associated with an operation mode that is started when the gesture is performed. The gesture of the user is a movement of the user operating the touch sensor of the remote control apparatus 20. Some among the gestures are a gesture of drawing a circle and a gesture of drawing a straight line.

Moreover, in this embodiment, some among the operation modes are an air-conditioner operation mode and an audio operation mode. The air-conditioner operation mode is for an operation to adjust a temperature, an air volume, etc. of an air conditioner. The audio operation mode is for an operation to adjust a volume, music selection, etc. relating to the audio apparatus.

For example, in a case where the air-conditioner operation mode is set to start when the user performs the gesture of drawing a straight line in a vertical direction on the touch sensor, information in which the gesture of drawing a straight line in the vertical direction is associated with the air-conditioner operation mode is among the mode information 12b. The mode information 12b may include screen information in which an image to be displayed on the screen when the corresponding operation mode is started is also associated with the operation mode. In this example, the mode information 12b includes data for the screen for setting the air conditioner.

The audio data 12c includes the sound effects associated with the operation modes. For example, in a case where a specific sound effect is output (e.g. "beep" sound) when the air-conditioner operation mode is started, information in which the air-conditioner operation mode is associated with the sound "beep" is among the audio data 12c.

The controller 13 is, for example, a microcomputer including a CPU, a RAM, a ROM, etc. The controller 13 controls mainly the control apparatus 10, the remote control apparatus 20, etc. The CPU of the controller 13 executes the program 12a stored in the memory 12 (performs an arithmetic calculation in accordance with the program 12a). Thus, different functions necessary for the controller 13 are implemented.

An operation determiner 13a, a mode selector 13b, an image generator 13c, a sound controller 13d and a vibration controller 13e, shown in FIG. 3, are a part of the functions of the controller 13 that are implemented by execution of the program 12a.

The operation determiner 13a determines the content of the operation of the user. Specifically, the operation determiner 13a acquires, from the remote control apparatus 20, position information about a position touched by the user, and determines the operation performed by the user. Moreover, the operation determiner 13a determines the gesture performed by the user, based on the acquired position information. For example, in a case where a result of connecting the temporarily-continuous position information acquired from the remote control apparatus 20 is a straight line in the vertical direction, the operation determiner 13a determines that the user has performed the gesture of drawing a straight line in the vertical direction. Similarly, in a case where the result of connecting the temporarily-continuous position information acquired from the remote control apparatus 20 is a circle or the like, the operation determiner 13a determines that the user has performed the gesture of drawing a circle. In other words, the operation determiner 13a determined a track of changes of the positions touched by the user.

The mode selector 13b determines whether or not the gesture determined by the operation determiner 13a is a gesture for starting any of the operation modes. In the description below, the gestures corresponding to the operation modes are referred to also as "specific operation" and "specific gesture." In a case where the gesture is the specific gesture, the mode selector 13b selects the operation mode corresponding to the gesture based on the mode information stored in the memory 12 and starts the operation mode.

The image generator 13c generates image data that is projected by the HUD apparatus 30 and sends the image data to the HUD apparatus 30 via the communication part 11.

Once any of the operation modes is started by an operation of the user with the remote control apparatus 20, the image generator 13c generates the image data corresponding to the started operation mode and sends the image data to the HUD apparatus 30. Thus, the HUD apparatus 30 projects and displays an image corresponding to the operation mode.

The sound controller 13d controls the audio data 12c that is output from the sound output apparatus 40. In this embodiment, when one of the operation modes is started, the sound controller 13d outputs the sound effect corresponding to the started operation mode. For example, in a case where the air-conditioner operation mode is started by the gesture of drawing a straight line in the vertical direction by the user, the sound controller 13d reads out the audio data of "beep" sound corresponding to the air-conditioner operation mode, from the memory 12, and outputs the beep sound from the sound output apparatus 40.

The vibration controller 13e controls the vibration of the touch sensor of the remote control apparatus 20, based on the content of the operation (gesture) of the user determined by the operation determiner 13a. Specifically, the vibration controller 13e vibrates an oscillator of the remote control apparatus 20, described later, based on the started operation mode. For example, once the user performs the gesture of drawing a straight line in the vertical direction (i.e., once the air-conditioner operation mode is started), the vibration controller 13e controls the oscillator to vibrate at a constant strength. Moreover, once the user performs the gesture of drawing a circle (i.e., once the audio operation mode is started), the vibration controller 13e controls the oscillator to vibrate while periodically changing vibration strength given to the oscillator. Thus, vibration of the touch sensor can be changed based on the content of the operation of the user. Therefore, the touch feeling given to the user can be changed for each content of the operation. In other words, the user can gain a different feedback for each content of the operation.

Figure 4:
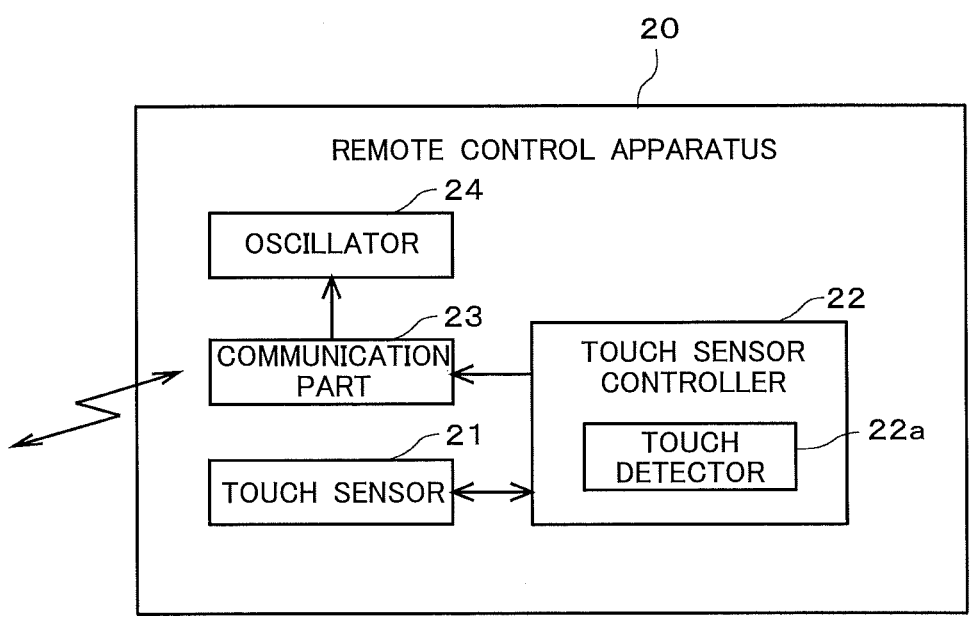
FIG. 4 illustrates an outline of a remote control apparatus.

Next, a configuration of the remote control apparatus 20 is described. FIG. 4 illustrates a schematic configuration of the remote control apparatus 20. As shown in FIG. 4, the remote control apparatus 20 includes a touch sensor 21, a touch sensor controller 22, a communication part 23 and an oscillator 24.

The touch sensor 21 is a flat-board-shaped sensor to which the user performs an operation. The remote control apparatus 20 itself does not include a display function and functions as a so-called touch pad. In this embodiment, a position of the touch sensor 21 of the remote control apparatus 20 is associated with a position of the screen projected by the HUD apparatus 30. The user performs the operation to the touch sensor 21 while looking at the screen projected by the HUD apparatus 30.

In other words, when the user touches a region of the touch sensor 21 corresponding to a command button displayed on the screen projected by the HUD apparatus 30, the user can give a command associated with the command button. As described above, the user performs the specific gesture on an operation surface of the touch sensor 21. Thus, the operation mode corresponding to the gesture is started.

An example of a system used for the touch sensor 21 is an electrostatic capacitance system that detects a touched position by recognizing a change in electrostatic capacitance. The user can perform not only a one-point touch operation that is performed by touching one point on the operation surface of the touch sensor 21 but also a multi-touch operation that is performed by touching plural points on the operation surface of the touch sensor 21.

The touch sensor controller 22 is, for example, a hardware circuit. The touch sensor controller 22 controls the touch sensor 21. The touch sensor controller 22 includes a touch detector 22a that detects a position touched by a user on the operation surface of the touch sensor 21, based on a signal caused on the touch sensor 21.

The touch detector 22a detects the position (e.g., X-Y coordinate) touched by the user, for example, based on a mutual capacitance method that measures a change in electrostatic capacitance between two electrodes that are a driving electrode and a reception electrode. Since electrical charge received by the reception electrode is decreased by a user's finger that interrupts an electrical field, the touch detector 22a detects whether or not the user touches, based on a decrease in the electrical charge.

The touch detector 22a determines whether the user touches the operation surface of the touch sensor 21 at one point or plural points. Then, in a case where the user touches the operation surface of the touch sensor 21 at one point, the touch detector 22a detects a position of the one point. However, in a case where the user touches the operation surface of the touch sensor 21 at plural points, the touch detector 22a detects a position of each of the plural points.

The communication part 23 is communicably connected to the control apparatus 10 via wireless communications, such as Wi-Fi (registered trademark), and sends and receives various types of information to/from the control apparatus 10. For example, the communication part 23 sends, to the control apparatus 10, the position information (e.g., X-Y coordinate) about the position detected by the touch detector 22a as the position touched by the user, and the communication part 23 receives a control signal for vibrating the oscillator 24 (hereinafter referred to as "vibration control signal") from the control apparatus 10.

Figure 5:
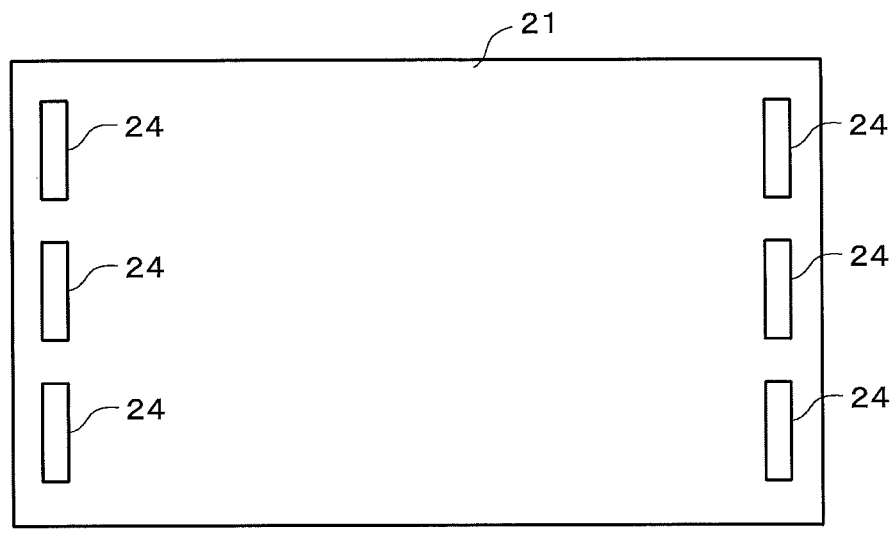
FIG. 5 illustrates an outline of a touch sensor.

The oscillator 24 is a member that vibrates the operation surface of the touch sensor 21. The oscillators 24, as shown in FIG. 5, are disposed along sides of the operation surface of the touch sensor 21. The operation surface of the touch sensor 21 is vibrated by vibration of the oscillators 24 themselves. The oscillators 24 vibrate based on the vibration control signal from the control apparatus 10. The oscillators 24 are, for example, piezoelectric elements.

As described above, the user performing the operation to the touch sensor 21 gains the touch feeling by the touch sensor 21 vibrated by the vibration of the oscillators 24. The touch feelings are varied based on the contents of the operations. Thus, the user can gain different touch feelings corresponding to the contents of the operations.

Figure 6:
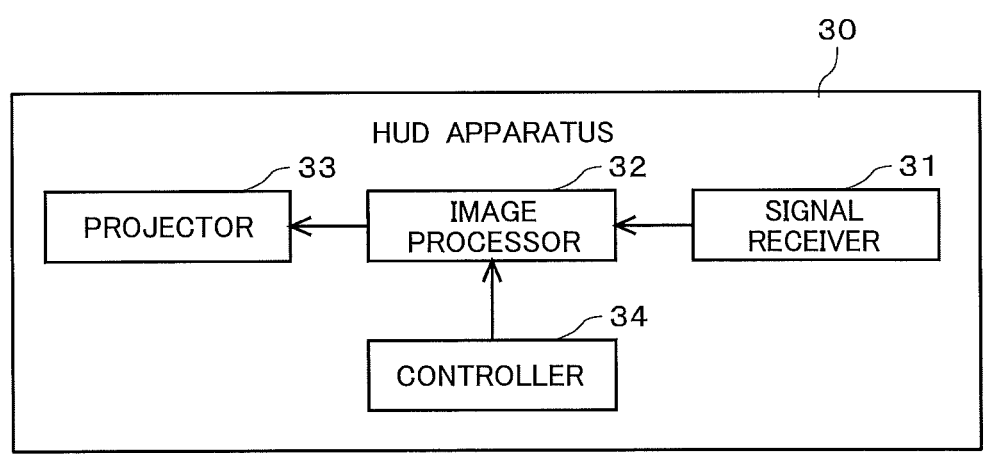
FIG. 6 illustrates an outline of a HUD apparatus.

Next, a configuration of the HUD apparatus 30 is described. FIG. 6 illustrates a schematic configuration of the HUD apparatus 30. As shown in FIG. 6, the HUD apparatus 30 includes a signal receiver 31, an image processor 32, a projector 33 and a controller 34.

The signal receiver 31 receives the image data from the control apparatus 10. Once the user operates the touch sensor 21 of the remote control apparatus 20 by performing the specific gesture, the operation mode corresponding to the gesture is started. Then, the control apparatus 10 generates the image data corresponding to the started operation mode, and sends the generated image data to the HUD apparatus 30. The signal receiver 31 of the HUD apparatus 30 receives the image data.

The image processor 32 performs a process necessary to display the image data received by the signal receiver 31 and outputs the processed imaged data to the projector 33.

The projector 33 outputs projection light for an image of the image data by using, for example, a DLP method or a LCOS method, and projects and displays the image on the front windshield or a screen for the system.

The controller 34 is a microcomputer including, for example, a CPU, a RAM and a ROM, etc., and controls the entire HUD apparatus 30 comprehensively.

Once the user performs the specific gesture and the operation mode corresponding to the specific gesture is started, the sound output apparatus 40 receives the audio data of the sound effect corresponding to the operation mode and outputs the sound effect to the outside.

<1-3. Generation Method and Types of Touch Feeling>

Next described are a generation method of the touch feeling by vibrating the touch sensor 21 and types of the touch feeling in this embodiment.

FIG. 5 illustrates a pattern diagram of the touch sensor 21. As described above, the oscillators 24 are disposed along the sides of the touch sensor 21. In this embodiment, the oscillators 24 are arranged along two sides that are facing each other, of the touch sensor 21. However, arrangement of the oscillators 24 is not limited to this arrangement but any number of the oscillators 24 may be arrange on any side.

As described above, once the user performs the specific gesture, the operation mode corresponding to the specific gesture is also started, and the touch feeling is also started because the content of the operation is fed back to the user. In this embodiment, the phrase "operation mode is started" means changing to one operation mode and the phrase "touch feeling is started" means giving a touch feeling to the user by vibrating the touch sensor.

In order to generate the touch feeling, first, the oscillators 24 are vibrated at a fast speed based on the vibration control signal from the control apparatus 10. Being vibrated at a fast speed means, for example, being vibrated at an ultrasonic frequency. The surface of the touch sensor 21 is vibrated at an ultrasonic frequency by vibrating the oscillators 24 at an ultrasonic frequency. The entire touch sensor 21 is vibrated substantially evenly by vibrating the oscillators 24 arranged on the two sides facing each other, as shown in FIG. 5.

If the operation surface of the touch sensor 21 is operated with a finger in a state in which the operation surface of the touch sensor 21 is being vibrated at the ultrasonic frequency, a high-pressure air film is generated between the finger and the operation surface of the touch sensor 21 vibrating at the ultrasonic frequency and thus frictional resistance is reduced. Accordingly, the user gains a touch feeling that the finger slips smoothly and slipperily (hereinafter referred to as "slippery touch feeling") as compared to a state in which the operation surface of the touch sensor 21 is not vibrated.

If the vibration of the oscillators 24 is stopped during the ultrasonic vibration of the operation surface of the touch sensor 21, the ultrasonic vibration of the operation surface of the touch sensor 21 is also stopped. Thus, the reduced frictional resistance of the operation surface of the touch sensor 21 returns back to normal frictional resistance (in a state without vibration). In other words, a low friction state is changed to a high friction state. In this case, the slippery touch feeling is changed to a touch feeling of resistance. When the slippery touch feeling is changed to the touch feeling of resistance, the user gains a touch feeling of clicking. This touch feeling of clicking is hereinafter referred to as "click touch feeling."

Moreover, if the operation surface of the touch sensor 21 is vibrated at the ultrasonic frequency by the oscillators 24 of which vibration strength is changing, vibration amplitudes of the surface of the touch sensor 21 can be changed to a relatively large amplitude or to a relatively small amplitude. Thus, the surface of the touch sensor 21 is in a state in which the low friction state and the high friction state are alternately repeated. In other words, the user feels touch feelings of the slippery touch feeling and the click touch feeling alternately. In this case, the user gains a touch feeling of unevenness or a touch feeling of roughness (hereinafter referred to as "rough touch feeling").

Moreover, a degree of the roughness of the touch feeling can be changed by changing the vibration strength or changing a cycle for changing the vibration strength. Thus, plural types of the touch feeling of phased roughness can be generated, such as a rougher touch feeling, less rough touch feeling and a high/low density of roughness.

In this embodiment, a touch feeling can be given to the user by vibrating the surface of the touch sensor 21 at an ultrasonic frequency by vibrating the oscillators 24 at an ultrasonic frequency. The frictional resistance of the surface of the touch sensor 21 can be changed by controlling a start time and a stop time of the ultrasonic vibration or the strength of the ultrasonic vibration. Change in the frictional resistance of the surface of the touch sensor 21 gives different types of touch feelings to the user.

<1-4. Start of Operation Mode and Start of Touch Feeling>

Next, a process for starting the operation mode and a process for starting the touch feeling corresponding to the started operation mode are described. In this embodiment, as described above, the air-conditioner operation mode and the audio operation mode are some among the operation modes used for the operation system 1. Once the air-conditioner operation mode is started, the slippery touch feeling is started. Once the audio operation mode is started, the rough touch feeling is started. Details are described below.

When the user performs an operation of touching the touch sensor 21 of the remote control apparatus 20 in the vertical direction, the control apparatus 10 determines that the gesture of drawing a line in the vertical direction has been performed and then starts the air-conditioner operation mode. Once the air-conditioner operation mode is started, the control apparatus 10 starts the slippery touch feeling corresponding to the air-conditioner operation mode.

Specifically, once the air-conditioner operation mode is started, the control apparatus 10 controls the oscillators 24 based on the vibration control signal for vibrating the oscillators 24 at an ultrasonic frequency at a constant strength. Thus, the oscillators 24 are vibrated at the ultrasonic frequency. As a result, the surface of the touch sensor 21 is vibrated at an ultrasonic frequency. The frictional resistance between the touch sensor 21 and a finger of the user performing a touch operation is reduced by vibrating the surface of the touch sensor 21 at the ultrasonic frequency, and the user gains the slippery touch feeling.

Moreover, when the user performs an operation of drawing a circle on the touch sensor 21 of the remote control apparatus 20, the control apparatus 10 determines that the gesture of drawing a circle has been performed and starts the audio operation mode. Once the audio operation mode is started, the control apparatus 10 starts the rough touch feeling corresponding to the audio operation mode.

Specifically, once the audio operation mode is started, the control apparatus 10 controls the oscillators 24 based on the vibration control signal for vibrating the oscillators 24 at an ultrasonic frequency while changing a strength of the ultrasonic vibration in a predetermined cycle. Thus, the oscillators 24 are vibrated at the ultrasonic frequency while changing the strength of the ultrasonic vibration. As a result, the surface of the touch sensor 21 is vibrated at an ultrasonic frequency while changing the strength of the surface of the touch sensor 21. The frictional resistance between the touch sensor 21 and the finger of the user performing the touch operation is changed by changing the strength of the ultrasonic vibration of the surface of the touch sensor 21, and the user gains the rough touch feeling.

As described above, when the user performs the specific gesture, the operation mode and the touch feeling corresponding to the performed specific gesture are started. Therefore, the user can recognize the started operation mode without looking at the remote control apparatus 20 at hand, based on the touch feeling.

Further, when the operation mode is started, the control apparatus 10 outputs the sound effect in addition to starting the touch feeling. Specifically, when any of the operation modes is started, the control apparatus 10 reads out, from the memory 12, the audio data of the sound effect corresponding to the started operation mode, and outputs the read-out audio data from the sound output apparatus 40. As described above, by outputting the sound effect corresponding to each of the operation modes, the user can recognize the stared operation mode through hearing.

<1-5. Adjustment Operation in Each Operation Mode>

Figure 7:
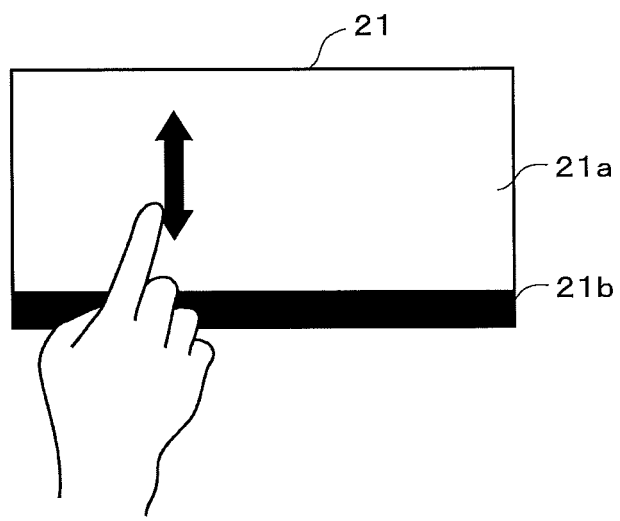
FIG. 7 illustrates operation performed to the touch sensor.

Next described is an adjustment operation after start of each operation mode, with reference to the drawings. FIG. 7 illustrates the user who is operating the touch sensor 21 of the remote control apparatus 20. The touch sensor 21 includes a first region 21a for receiving an operation of the user and a second region 21b for changing an ongoing operation mode to an initial state. Once the user performs a touch operation on the first region 21a, control corresponding to a content of the touch operation is performed. However, once the user touches the second region 21b, the ongoing operation mode is changed to the initial state. In other words, when the second region 21b is touched while any of the operation modes is ON, the ongoing operation mode is cancelled.

As shown in FIG. 7, once the user performs the operation of drawing a line in the vertical direction on the first region 21a of the touch sensor 21, the air-conditioner operation mode is started. Once the air-conditioner operation mode is started, the slippery touch feeling is started and also an air-conditioner adjustment screen for an operation to adjust the air conditioner is displayed. The air-conditioner adjustment screen is displayed by the HUD apparatus 30 projecting image data acquired from the control apparatus 10. In other words, the user can recognize the start of the air-conditioner operation mode by the start of the touch feeling, and since the air-conditioner adjustment screen is displayed in front of the user, the user can perform an operation without looking at hand.

Figure 8:
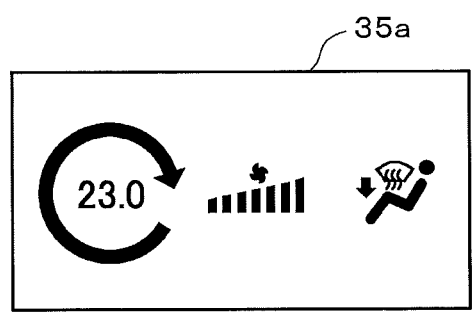
FIG. 8 illustrates a screen displayed for an air-conditioner operation mode.

FIG. 8 illustrates an air-conditioner adjustment screen 35a projected and displayed by the HUD apparatus 30. As shown in FIG. 8, a temperature adjustment image, an air volume adjustment image and an airflow direction (air outlet) adjustment image are displayed in order on the air-conditioner adjustment screen 35a from a left side of the air-conditioner adjustment screen 35a. Each of those images shows an item of which setting can be changed and displays a currently set state of the item. When the user desires to change (adjust) the setting of any of the adjustable items, the user can select the desired adjustment image by operating the touch sensor 21 at hand while looking at the air-conditioner adjustment screen 35a in front of the user. In other words, the user can select the desired adjustable item.

Specifically, when the user touches a left portion of the first region 21a which is divided into three portions in a left-right direction (hereinafter referred to simply as "left portion") in a state in which the air-conditioner adjustment screen 35a is displayed, temperature adjustment becomes selected. Similarly, when the user touches a center portion of the first region 21a which is divided into three portions in the left-right direction (hereinafter referred to simply as "center portion"), air volume adjustment becomes selected, and when the user touches a right portion of the first region 21a which is divided into three portions in the left-right direction (hereinafter referred to simply as "right portion"), an airflow direction adjustment becomes selected.

For selection of the adjustable items, it is preferable that the item being selected should be displayed in a different size or in a different color from a size or a color when the item is not being selected. In other words, the displayed adjustable item being selected stands out as compared with other adjustable items or is lit in a different color from a color of the other adjustable items. By being displayed differently from when the item is not being selected, the adjustable item being selected can be distinguished from the other adjustable items, and the adjustable item currently being selected can be distinct.

When the user taps the first region 21a in a state in which the desired adjustable item is being selected, setting of the adjustable item being selected is determined to be changed. In this case, the air-conditioner adjustment screen 35a is changed to a screen for changing the setting of the selected adjustable item. For example, in a case where setting of a temperature (temperature adjustment) is determined to be changed, the air-conditioner adjustment screen 35a, as shown in FIGS. 9A-9C, is displayed.

Figure 9A:
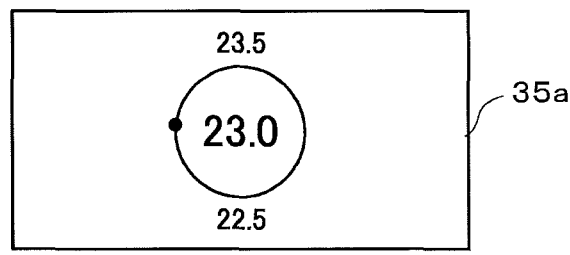
FIGS. 9A-9C illustrate a temperature adjustment operation.
Figure 9B:
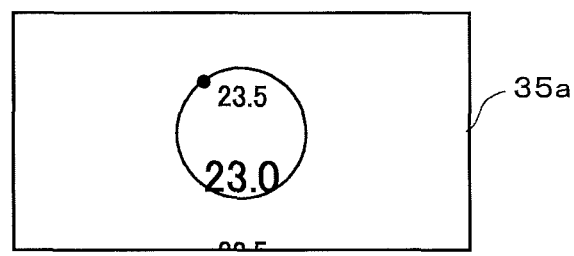
Figure 9C:
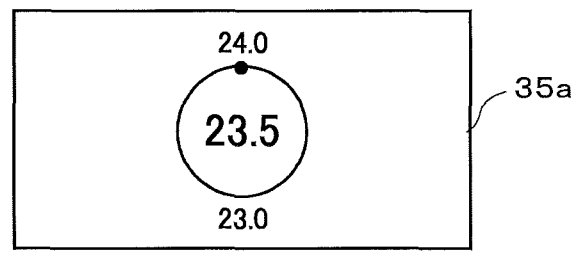

FIGS. 9A-9C illustrate the screen for changing the setting of the temperature. In FIG. 9A, a currently set temperature value is displayed in a center portion. Moreover, immediately greater and lower settable temperature values and a mark showing a state of a change operation are displayed around the currently set temperature value. When the user performs the operation of drawing a circle on the touch sensor 21, the settable temperature value is changed based on an operation value and an operation direction of the operation. Moreover, the mark showing the state of the change operation is used by the user to recognize that the ongoing operation is temperature adjustment. When the user performs the operation of drawing a circle, the mark is moved based on an operation amount and in a direction of the operation performed by drawing a circle by the user.

For example, when the user performs an operation of drawing about one or so circle clockwise on the touch sensor 21 in a state shown in FIG. 9A, the mark is moved clockwise by approximately one-eighth of the one circle, as shown in FIG. 9B, and the set value is moved from currently set 23.0 degrees to a next greater value 23.5 degrees. When the user performs an operation of drawing one circle counterclockwise, the mark is moved from currently set 23.0 degrees to a next smaller value 22.5 degrees. As described above, the mark is moved based on the operation amount and the direction of the touch operation of the user, and the temperature settable value is scrolled as the mark moves.

Further, when the user performs an operation of drawing about one circle on the touch sensor 21, the mark is further moved by one-eighth of the one circle, as shown in FIG. 9B, and the set temperature 23.5 degrees is displayed on the center portion. In this state, when the user taps the first region 21a of the touch sensor 21, it is determined to change the set temperature value to 23.5 degrees. As described above, by a predetermined operation performed by the user on the touch sensor 21, the settable value displayed on the air-conditioner adjustment screen 35a is changed based on the operation amount of the operation, and if the user performs a determination operation at a desired settable value, the set temperature is changed to the determined settable value.

Then, after the determination operation for the adjustment, the image on the screen projected by the HUD apparatus 30 is changed to the air-conditioner adjustment screen 35a shown in FIG. 8. In other words, the screen is changed to a screen in one upper hierarchy with which the user can perform an operation for air-conditioner adjustment. When a predetermined time period has passed in this state with no operation, the screen is changed to a screen in one more upper hierarchy and eventually a screen in a top hierarchy or a screen having no selected item is displayed.

A screen change after the determination operation is not limited to the change described above. The screen (e.g., a screen shown in FIG. 9C) displayed at a time at which the determination operation has been performed continues to be displayed, and each time when a predetermined time period passes with no operation, a screen may be changed to a screen in one upper hierarchy. Moreover, immediately after the determination operation is performed, the screen in the top hierarchy or the screen having no selected item may be displayed. Moreover, a screen change after a determination for each adjustment operation, described below, may be similar.

FIGS. 10A-10C illustrate a screen for changing the setting of the air volume. When the air-conditioner adjustment screen 35a shown in FIG. 8 is displayed, if the user taps the first region 21a in a state in which an air volume adjustment image is being selected (i.e., a state in which the user has performed a touch operation to the center portion of the first region 21a), the air-conditioner adjustment screen 35a is changed to a screen shown in FIG. 10A. In FIG. 10A, a currently-set value is displayed.

Similarly to a case of the temperature adjustment, when the user performs an operation of drawing a circle on the touch sensor 21, a set value of the air volume is changed based on an operation volume and an operation direction of the operation. If a direction of drawing a circle is reversed, an increase/a decrease in values is reversed. For example, in a case where the user performs the operation of drawing a circle clockwise, the settable value is changed to be greater. In a case where the user performs an operation of drawing a circle counterclockwise, the settable value is changed to be smaller.

In other words, as shown in FIG. 10B, when the user performs the operation of drawing a circle counterclockwise, the settable value for the air volume is changed to be smaller based on an operation amount of the operation. Moreover, as shown in FIG. 10C, when the user performs an operation of drawing a circle clockwise, the settable value for the air volume is changed to be greater based on an operation amount of the operation. When the user taps the first region 21a at a desired settable value, the air volume is changed to the determined settable value.

FIGS. 11A-11C illustrate a screen for changing the setting of the airflow direction (air outlet). When the air-conditioner adjustment screen 35a shown in FIG. 8 is displayed, if the user taps the first region 21a in a state in which an airflow direction adjustment image is being selected (i.e., a state in which the user has performed a touch operation to the right portion of the first region 21a), the air-conditioner adjustment screen 35a is changed to a screen shown in FIG. 11A. In FIG. 11A, a currently-set value is displayed.

Similarly to a case of the temperature adjustment, when the user performs an operation of drawing a circle on the touch sensor 21, a set value of the airflow direction is changed based on an operation volume and an operation direction of the operation. In other words, as shown in FIGS. 11A and 11C, the displayed settable value for the airflow direction is scrolled and changed based on the operation volume and the operation direction of the operation of the user. If the user performs the determination operation at a desired settable value, the set airflow direction is changed to the settable value. Moreover, if a direction of drawing a circle is reversed, a scrolling direction also can be reversed.

Figure 12:
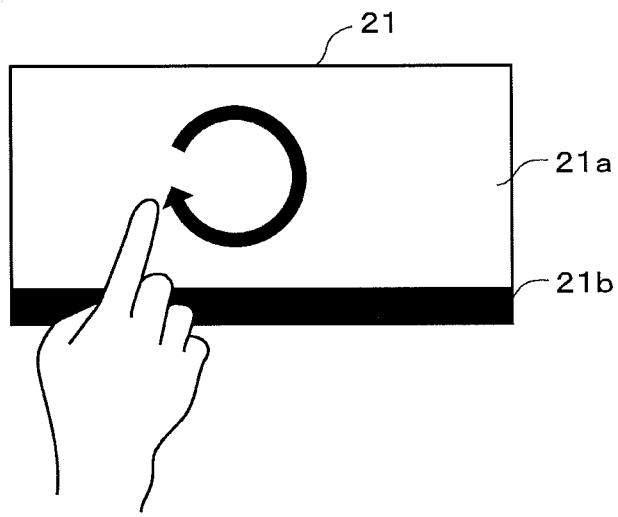
FIG. 12 illustrates a touch sensor operation.

Next, an operation in the audio operation mode is described. As shown in FIG. 12, in the initial state in which any operation mode is not started, once the user performs the operation of drawing a circle on the first region 21a of the touch sensor 21, the audio operation mode is started. Once the audio operation mode is started, the rough touch feeling is started and an audio adjustment screen for an operation to adjust an audio is displayed. The audio adjustment screen is displayed by the HUD apparatus 30 projecting the image data acquired from the control apparatus 10. In other words, the user can recognize start of the audio operation mode by start of the touch feeling. Since the audio adjustment screen is displayed in front of the user, the user can perform an operation without looking at hand.

Figure 13:
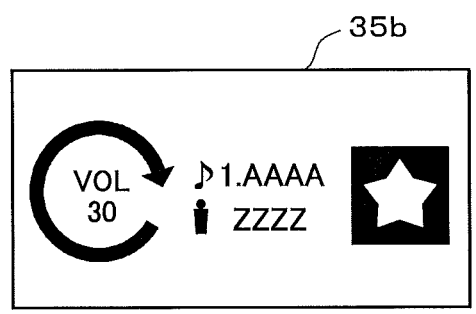
FIG. 13 illustrates a screen displayed for an audio operation mode.

FIG. 13 illustrates an audio adjustment screen 35b projected and displayed by the HUD apparatus 30. As shown in FIG. 13, a volume adjustment image, a music title selection image and an album selection image are displayed in order on the audio adjustment screen 35b from a left side of the audio adjustment screen 35b. Each of those images shows an item of which setting can be changed and displays a currently set state of the item. When the user desires to change (adjust) the setting of any of the adjustable items, the user can select the desired adjustment image by operating the touch sensor 21 at hand while looking at the audio adjustment screen 35b in front of the user. In other words, the user can select the desired adjustable item.

Specifically, similarly to the explanation above, when the user touches the left portion in a state in which the audio adjustment screen 35b is displayed, the volume adjustment image becomes selected. When the user touches the center portion, the music title selection image becomes selected, and when the user touches the right portion, the album selection image becomes selected.

Similarly to the explanation above, by being displayed differently from when the item is not being selected, the adjustable item being selected can be clearly distinguished from the other adjustable items. When the user taps the first region 21a in the state in which the desired adjustable item is being selected, setting of the adjustable item being selected is determined to be changed. In other words, the audio adjustment screen 35b is changed to a screen for changing the setting of the selected adjustable item. For example, in a case where setting of a volume (volume adjustment) is determined to be changed, the audio adjustment screen 35b is changed to a screen shown in FIGS. 14A-14C.

FIGS. 14A-14C illustrate the screen for changing the setting of the volume. In FIG. 14A, a currently set volume value is displayed in a center portion. Moreover, immediately greater and lower settable volume values and a mark showing a state of a change operation are displayed around the currently set volume value. Similarly to the explanation above, when the user performs the operation of drawing a circle on the touch sensor 21, the settable volume value is changed based on an operation value and an operation direction of the operation. Moreover, when the user performs the operation of drawing a circle, the mark showing the state of the change operation is moved based on an operation amount and in a direction of the operation performed by drawing a circle by the user.

For example, when the user performs an operation of drawing a circle clockwise in a state shown in FIG. 14A, the mark and the volume settable value are gradually moved, as shown in FIGS. 14B and 14C. In other words, the mark is moved based on the operation amount and the direction of the operation of the user, and the volume settable value is scrolled.

When the user taps the first region 21a of the touch sensor 21 in a state in which the desired volume settable value is displayed, it is determined to change the set volume to the displayed volume settable value. By a predetermined operation performed by the user on the touch sensor 21, the settable value displayed on the audio adjustment screen 35b is changed based on the operation amount and the direction of the operation. If the user performs the determination operation at a desired settable volume, the volume is changed to the determined settable value.

In the adjustment operations described above, the set values are changed by the operation of drawing a circle. However, an operation for changing the currently set value is not limited to the operation of drawing a circle. The operation for changing the currently set value may be an operation of drawing a line. In this case, an operation amount and a direction (drawing the line upward, downward, rightward or leftward) of the operation of drawing a line may be used instead of the operation amount and the direction of the operation of drawing a circle. Moreover, an operation for changing the currently set value may not be the operation of drawing an exact circle or line. The operation for changing the currently set value may be an operation of drawing a curved line or a wavy line.

This embodiment describes that the mark is moved by one-eighth every time when the user performs the operation of drawing one circle on the touch sensor 21. However, the embodiment is not limited to the ratio. A ratio between the operation amount of the operation performed by the user and a moved amount of the mark may be set arbitrarily, for example, 4:1, 3:1, 2:1, or 1:1.

<1-6. System Process>

Figure 15:
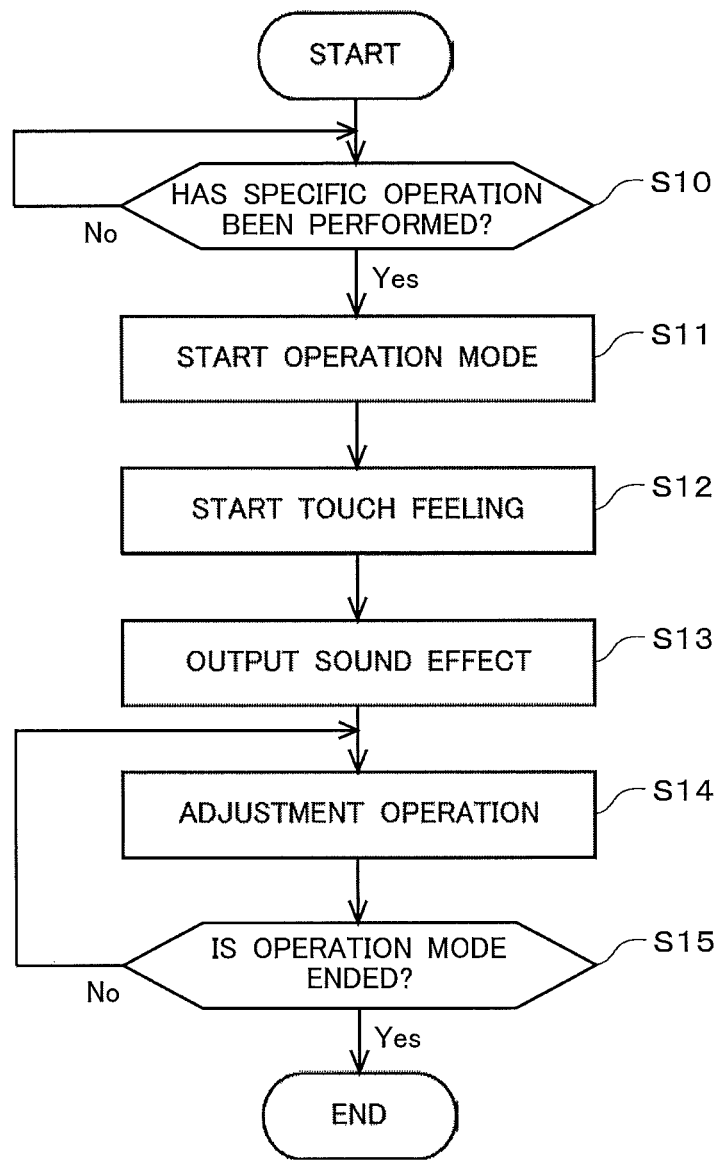
FIG. 15 illustrates a flowchart showing a process of the operation system.

Next, a process that is performed by the operation system 1 is described. FIG. 15 illustrates a flowchart showing the process of the operation system 1. The operation system 1 starts the process once the operation system 1 is powered and started. The operation system 1 stands by until the user performs an operation while observing whether or not the specific operation is performed (a step S10). Specifically, the control apparatus 10 observes whether or not the specific gesture has been performed to start the operation mode.

The control apparatus 10 acquires the position information (e.g., X and Y coordinates) about the operations of the user with the remote control apparatus 20 and determines whether or not the specific gesture has been performed based on the temporarily-continuous position information. For example, the control apparatus 10 derives a change angle based on changes of the X and Y coordinates. In a case where the control apparatus 10 determines that the gesture has turned 360 degrees from a starting point, the control apparatus 10 determines that the user has performed the gesture of drawing a circle.

In a case where the specific operation has not been performed (No in the step S10), the control apparatus 10 returns to observation of whether or not the specific gesture has been performed. On the other hand, in a case where the specific operation has been performed (Yes in the step S10), the control apparatus 10 starts the operation mode corresponding to the specific operation (a step S11). In other words, in a case where the control apparatus 10 determines that the user has performed the operation of drawing a line in the vertical direction, the control apparatus 10 starts the air-conditioner operation mode. In a case where the control apparatus 10 determines that the user has performed the operation of drawing a circle, the control apparatus 10 starts the audio operation mode.

Once any of the operation modes is started, the control apparatus 10 starts the touch feeling corresponding to the started operation mode (a step S12). In other words, once starting the air-conditioner operation mode, the control apparatus 10 starts the slippery touch feeling and once starting the audio operation mode, the control apparatus 10 starts the rough touch feeling. The control apparatus 10 gives the slippery touch feeling to the user by vibrating the oscillators 24 at an ultrasonic frequency at a constant strength. The control apparatus 10 gives the rough touch feeling to the user by vibrating the oscillators 24 while changing the strength of the ultrasonic vibration.

The control apparatus 10 outputs the sound effect corresponding to the started operation mode (a step S13). For example, in the case where the control apparatus 10 starts the air-conditioner operation mode, the control apparatus 10 outputs the sound effect "beep" corresponding to the air-conditioner operation mode, from the sound output apparatus 40.

Next, the adjustment operation is performed (a step S14). In other words, as described above, the adjustment operation is performed for an item desired and selected by the user, among the various adjustable items of the started operation mode.

Then, the control apparatus 10 determines whether or not the started operation mode is ended (a step S15). In a case where any operation is not performed for a predetermined time period or where the user touches the second region 21b of the touch sensor 21, the operation mode is ended. The control apparatus 10 determines whether or not any of these conditions is satisfied. In a case where any of the conditions is not satisfied (No in the step S15), the control apparatus 10 causes the screen to be ready to receive an operation of the user again. In a case where any of the conditions is satisfied (Yes in the step S15), the control apparatus 10 releases and ends the operation mode.

As described above, the specific operations (gestures) are associated with the operation modes to be started and with the touch feelings to be given to the user. Thus, the user can recognize the ongoing operation mode only through the given touch feeling.

<2. Modifications>

The embodiment of the invention is described above. However, the invention is not limited to the foregoing embodiment and various modifications are possible. Such modifications are described below. Any form of the foregoing embodiment and the modifications below may be arbitrarily combined with one another.

<2-1. Modification 1>

In the foregoing embodiment, the air-conditioner operation mode and the audio operation mode are described as examples of the operation modes. After a corresponding operation mode is started, the adjustable item (temperature adjustment, volume adjustment, etc.) is determined to be adjusted and then the adjustment operation for the determined adjustable item is performed. However, the invention is not limited to that. The temperature adjustment, the volume adjustment, etc. may be operation modes, directly.

In other words, instead of the air-conditioner operation mode and the audio operation mode, each adjustable item is regarded as operation mode, such as a temperature adjustment operation mode, an air volume adjustment operation mode and a volume adjustment operation mode. When a specific gesture is performed, the corresponding operation mode is started and thus the adjustable item can be directly adjusted.

A concrete example is describes below. For example, an operation of drawing a circle is associated with the volume adjustment operation mode. When a user performs the operation of drawing a circle, the volume adjustment operation mode is started. Then, without displaying a screen for selecting the adjustable items as shown in FIG. 13, a screen as shown in FIG. 14A is first displayed, and thus the user can perform an operation for the volume adjustment with the screen. In other words, by performing the operation of drawing a circle after the operation mode is started, the user can adjust the volume based on an amount and a direction of a change.

In this modification, the operation of drawing a circle is associated with both of a gesture (specific operation) for starting the volume adjustment operation mode and a gesture (adjustment operation) for adjusting the volume. In a case where a same gesture is associated with a specific operation and an adjustment operation, after the operation mode is started by the gesture, the user can perform the adjustment operation by performing the same gesture again. In other words, the user can consecutively perform the specific operation for starting the operation mode and the adjustment operation for adjusting a set value. The user can perform the operation smoothly without changing the operations in the middle.

Moreover, once the operation mode is started, the touch feeling corresponding to the operation mode is also started. Thus, in a case where the user consecutively performs the same gesture, the user can recognize start of the operation mode. In other words, the touch feeling is started when the specific operation is changed to the adjustment operation. Therefore, the user can recognize a boundary between the specific operation and the adjustment operation. Therefore, the user can perform the same operation, while understanding the ongoing operation.

<2-2. Modification 2>

Moreover, in the foregoing embodiment, once the operation mode is started, the screen including the plural adjustable items is displayed and then one of the plural adjustable items is determined. Then, after a screen only including the determined adjustable item is displayed, the adjustment operation is performed. However, the invention is not limited to this. For example, an adjustment operation may be performed to a screen, including the plural adjustable items, which is displayed when the operation mode is started.

Specifically, once a user performs an operation of drawing a line in a vertical direction on a touch sensor 21, the air-conditioner operation mode is started. Then, a screen including three types of adjustable items (temperature adjustment, air volume adjustment and airflow direction adjustment), as shown in FIG. 8, is displayed. Then, in this modification, when the touch sensor 21 is operated in a state in which the screen is displayed, each adjustable item can be adjusted. In other words, in a state in which the screen shown in FIG. 8, is projected from the HUD apparatus 30 and is displayed, the user can adjust setting of each adjustable item by operating the touch sensor 21 at hand while looking at a displayed image.

Moreover, in this modification, the user adjusts a temperature by an operation of drawing a circle, an air volume by an operation of drawing a line in a horizontal direction and an airflow direction by an operation of drawing a line in the vertical direction. Once performing the operation of drawing a circle on a region (left portion) in which the image for temperature adjustment is displayed, the user can adjust the temperature. Once performing the operation of drawing a line in the horizontal direction on a region (center portion) in which the image for air volume adjustment is displayed, the user can adjust the air volume. Once performing the operation of drawing a line in the vertical direction on a region (right portion) in which the image for airflow direction adjustment is displayed, the user can adjust the airflow direction.

The adjustment operation can be performed to the screen displayed when the operation mode is started. Thus, changes of screens can be reduced. The desired item can be adjusted fast.

Figure 16:
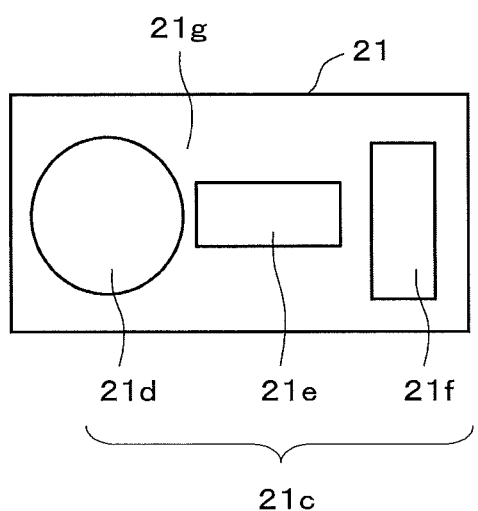
FIG. 16 illustrates an operable region.

A region 21c on which the adjustment operation can be performed for each adjustable item (hereinafter referred to as "operable region") may be set beforehand. For example, as shown in FIG. 16, a region for drawing a circle (circle-shaped region) is set as an operable region 21d for the temperature adjustment, on a left portion of the touch sensor 21. Moreover, a region for drawing a line in the horizontal direction (landscape rectangle region) is set as an operable region 21e, on a center portion of the touch sensor 21. A region for drawing a line in the vertical direction (portrait rectangle region) is set as an operable region 21f on a right portion of the touch sensor 21.

Operations performed by the user in those operable regions are valid. However, a touch operation and another operation performed by the user on a region 21g other than those operable regions (hereinafter referred to as "non-operable region") are invalid. Therefore, for example, even if the user performs the gesture of drawing a circle on the center portion, the gesture is regarded as an operation on a region other than the operable region 21d and the operation is not accepted. Therefore, a wrong operation can be prevented.

A touch feeling for the operable region 21c may be different from a touch feeling for the non-operable region 21g. For example, a slippery touch feeling is set for the operable region 21c. No touch feeling is set for non-operable region 21g. The touch feeling for the operable region 21c is set to be different from the touch feeling for the non-operable region 21g. Thus, the user can recognize the operable region without looking at the touch sensor 21.

The touch feeling may be set for each operable region of each adjustable item. For example, the slippery touch feeling is set for the operable region 21d for the temperature adjustment in the left portion. The very rough touch feeling is set for the operable region 21e for the air volume adjustment in the center portion. The soft rough touch feeling is set for the operable region 21f for the airflow direction adjustment in the right portion.

As described above, a different touch feeling is set for each operable region of each adjustable item. Thus, the user can recognize the operable region without looking at the touch sensor 21. In addition, the user can recognize the operable region for each adjustable item without looking at the touch sensor 21.

<2-3. Modification 3>

The foregoing embodiment explains the configuration in which, once the operation mode is started, the corresponding touch feeling is started. However, when a user performs an adjustment operation, a touch feeling may be started for each predetermined amount of the operation.

When a temperature adjustment operation, as shown in FIGS. 9A-9C, is performed after an air-conditioner operation mode is started, a predetermined touch feeling may be given to the user each time when an operation amount reaches a predetermined amount. For example, a click touch feeling is given to the user each time when the user draws one circle. In this case, the user is given a touch feeling of clicking each time when the user draws one circle. The user can recognize the operation amount based on the touch feeling.

As described above, the touch feeling is given not only at a time at which the operation mode is started but also for each predetermined operation amount during the operation. Thus, the user can recognize the operation amount in the operation mode. Moreover, the operation amount for giving the touch feeling is not limited to one circle. The operation amount for giving the touch feeling may be set arbitrarily. Moreover, a type of the touch feeling to be given may also be set arbitrarily.

<2-4. Modification 4>

The foregoing embodiment explains the configuration in which the user operates the remote control apparatus 20 while looking at the image projected by the HUD apparatus 30. However, the invention is not limited to the configuration. For example, the same configuration can be used for a case where a display apparatus including a touch sensor, such as a navigation system, is mounted in a car.

An oscillator that vibrates a touch sensor is provided to the touch sensor of the display apparatus. Once a user performs a predetermined operation, an operation mode corresponding to the operation is started and a touch feeling corresponding to the operation mode is started by vibrating the oscillator. Thus, the user can recognize the started operation mode.

As for an electronic device, such as a display apparatus, which the user uses while looking at the electronic device, the user can recognize a started operation mode without the touch feeling. However, in a case of an electronic device, such as a car navigation system, at which the user cannot keep looking, depending on a used condition, the user has to perform an operation without looking at the display apparatus. Therefore, in such a case, if the touch operation is given, the user can recognize a content of the operation without looking at the display apparatus. Thus, the convenience of use of the electronic device is improved.

In the foregoing embodiment, various functions are realized by software by an arithmetic process by the CPU according to a program. However, a part of the functions may be implemented electrically by a hardware circuit. On the other hand, a part of functions to be implemented by the hardware circuit may be implemented by software.

While the invention has been shown and described in detail, the foregoing description is in all aspects illustrative and not restrictive. It is therefore understood that numerous other modifications and variations can be devised without departing from the scope of the invention.

What is claimed is:

1. An operation apparatus that is operable in a plurality of operation modes, the operation apparatus comprising:
    a touch sensor that generates an output based on an operation performed to the touch sensor by an operator;
    a transducer attached to the touch sensor and configured to vibrate the touch sensor so as to give a touch feeling to the operator contacting the touch sensor; and
    a controller configured to (i) determine a content of the operation performed to the touch sensor by the operator based on the output of the touch sensor and (ii) select one of the plurality of operation modes based on the determined content of the operation performed to the touch sensor by the operator, wherein
    the controller causes the transducer to vibrate the touch sensor with different patterns of vibration so as to give different touch feelings to the operator contacting the touch sensor depending on the determined content of the operation performed to the touch sensor by the operator, the patterns of vibration resulting in a slippery touch feeling, a click touch feeling or a rough touch feeling depending on the operation mode, and
    when an adjustment operation is performed after the operation mode is started, a predetermined touch feeling selected from the different touch feelings is given to the operator each time when an operation amount reaches a predetermined amount, the adjustment operation including an operation of drawing a circle or a line, the predetermined amount including an operation distance and a direction of the operation of drawing the cirlci or the line.

2. The operation apparatus according to claim 1, wherein the content of the operation is a track of changes of touch points on the touch sensor touched by the operator.

3. The operation apparatus according to claim 1, wherein the plurality of operation modes are modes in which the adjustment operation is available for an other electronic device connected to the operation apparatus and
    the content of the operation to select one of the plurality of operation modes is identical to a content of an operation to adjust the other electronic device corresponding to the selected operation mode.

4. The operation apparatus according to claim 1, wherein in a case where the operator performs the operation on an operable region of the touch sensor, the transducer gives a different touch feeling as compared to a case where the operator performs the operation on a region other than the operable region.

5. The operation apparatus according to claim 1, wherein by a predetermined operation performed by the operator on the touch sensor, a settable value displayed on an adjustment screen is changed based on the operation amount, and if the user performs a determination operation at a desired settable value, a set temperature is changed to a determined settable value based on the result of the determination operation.

6. An operation system comprising an operation apparatus that is operable in a plurality of operation modes and a control apparatus that controls the operation apparatus, wherein
    the operation apparatus includes:
        a touch sensor that generates an output based on an operation performed to the touch sensor by an operator; and
        a transducer attached to the touch sensor and configured to vibrate the touch sensor so as to give a touch feeling to the operator contacting the touch sensor, and
    the control apparatus includes a controller configured to:
        determine a content of the operation performed to the touch sensor by the operator based on the output of the touch sensor; and select one of the plurality of operation modes based on the determined content of the operation performed to the touch sensor by the operator, wherein the controller causes the transducer to vibrate the touch sensor with different patterns of vibration so as to give different touch feelings to the operator contacting the touch sensor depending on the determined content of the operation performed to the touch sensor by the operator, the patterns of vibration resulting in a slippery touch feeling, a click touch feeling or a rough touch feeling depending on the operation mode, and when an adjustment operation is performed after the operation mode is started, a predetermined touch feeling selected from the different touch feelings is given to the operator each time when an operation amount reaches a predetermined amount, the adjustment operation including an operation of drawing a circle or a line, the predetermined amount including an operation distance and a direction of the operation of drawing the circle or the line.

7. The operation system according to claim 6, wherein the content of the operation is a track of changes of touch points on the touch sensor touched by the operator.

8. The operation system according to claim 6, wherein the plurality of operation modes are modes in which the adjustment operation is available for an other electronic device connected to the control apparatus and the content of the operation to select one of the plurality of operation modes is identical to a content of an operation to adjust the other electronic device corresponding to the selected operation mode.

9. The operation system according to claim 6, wherein in a case where the operator performs the operation on an operable region of the touch sensor, the transducer gives a different touch feeling as compared to a case where the operator performs the operation on a region other than the operable region.

10. The operation system according to claim 6, wherein by a predetermined operation performed by the operator on the touch sensor, a settable value displayed on an adjustment screen is changed based on the operation amount, and if the user performs a determination operation at a desired settable value, a set temperature is changed to a determined settable value based on the result of the determination operation.

11. An operation method for operating an operation apparatus in a plurality of operation modes, the operation method comprising the steps of:
 (a) determining, with a controller, a content of an operation performed by an operator to a touch sensor based on an output of the touch sensor;
 (b) selecting, with the controller, one of the plurality of operation modes based on the determined content of the operation performed to the touch sensor by the operator; and
 (c) the controller causing a transducer attached to the touch sensor to vibrate the touch sensor so as to give a touch feeling to the operator contacting the touch sensor, wherein
 the step (c) causes the transducer to vibrate the touch sensor with different patterns so as to give different touch feelings to the operator contacting the touch sensor depending on the content of the operation performed by the operator to the touch sensor determined by the step (a), the patterns of vibration resulting in a slippery touch feeling, a click touch feeling or a rough touch feeling depending on the operation mode, and
 (d) when an adjustment operation is performed after the operation mode is started, giving a predetermined touch feeling selected from the different touch feelings to the operator each time that an operation amount reaches a predetermined amount, the adjustment operation including an operation of drawing a circle or a line, the predetermined amount including an operation distance and a direction of the operation of drawing the circle or the line.

12. The operation method according to claim 11, wherein the content of the operation is a track of changes of touch points on the touch sensor touched by the operator.

13. The operation method according to claim 11, wherein the plurality of operation modes are modes in which the adjustment operation is available for an other electronic device connected to the operation apparatus and the content of the operation to select one of the plurality of operation modes is identical to a content of an operation to adjust the other electronic device corresponding to the selected operation mode.

14. The operation method according to claim 11, wherein in a case where the operator performs the operation on an operable region of the touch sensor, the step (c) causes the transducer to give a different touch feeling as compared to a case where the operator performs the operation on a region other than the operable region.

15. The operation method according to claim 11, wherein by a predetermined operation performed by the operator on the touch sensor, a settable value displayed on an adjustment screen is changed based on the operation amount, and if the user performs a determination operation at a desired settable value, a set temperature is changed to a determined settable value based on the result of the determination operation.

16. A non-transitory computer-readable recording medium that stores a program to be executed by a computer included in an operation apparatus that is operable in a plurality of operation modes, the program causing the computer to execute the steps of:
 (a) determining, with a controller, a content of an operation performed by an operator to a touch sensor based on an output of the touch sensor;
 (b) selecting, with the controller, one of the plurality of operation modes based on the determined content of the operation performed to the touch sensor by the operator; and
 (c) the controller causing a transducer attached to the touch sensor to vibrate the touch sensor so as to give a touch feeling to the operator contacting the touch sensor, wherein
 the step (c) causes the transducer to vibrate the touch sensor with different patterns so as to give different touch feelings to the operator contacting the touch sensor depending on the content of the operation performed by the operator to the touch sensor determined by the step (a), the patterns of vibration resulting in a slippery touch feeling, a click touch feeling or a rough touch feeling depending on the operation mode, and
 (d) when an adjustment operation is performed after the operation mode is started, giving a predetermined touch feeling selected from the different touch feelings to the operator each time that an operation amount reaches a predetermined amount, the adjustment operation including an operation of drawing a circle or a line, the predetermined amount including an operation distance and a direction of the operation of drawing the circle or the line.

17. The recording medium according to claim 16, wherein the content of the operation is a track of changes of touch points on the touch sensor touched by the operator.

18. The recording medium according to claim 16, wherein the plurality of operation modes are modes in which the adjustment operation is available for an other electronic device connected to the operation apparatus and the content of the operation to select one of the plurality of operation modes is identical to a content of an operation to adjust the other electronic device corresponding to the selected operation mode.

19. The recording medium according to claim 16, wherein in a case where the operator performs the operation on an operable region of the touch sensor, the step (c) causes the transducer to give a different touch feeling as compared to a case where the operator performs the operation on a region other than the operable region.

20. The recording medium according to claim 16, wherein by a predetermined operation performed by the operator on the touch sensor, a settable value displayed on an adjustment screen is changed based on the operation amount, and if the user performs a determination operation at a desired settable value, a set temperature is changed to a determined settable value based on the result of the determination operation.

\* \* \* \* \*